United States Patent [19]

Jessop

[11] Patent Number: 4,913,527
[45] Date of Patent: Apr. 3, 1990

[54] LENS FOCUS ADJUSTMENT MEANS

[75] Inventor: Thomas C. Jessop, Webster, N.Y.

[73] Assignee: Eastman Kodak Company, Rochester, N.Y.

[21] Appl. No.: 246,575

[22] Filed: Sep. 19, 1988

[51] Int. Cl.$^4$ .............................................. G02B 7/02
[52] U.S. Cl. .................................. 350/255; 350/252
[58] Field of Search ............... 350/252, 255, 247, 245, 350/246, 633; 254/286; 355/55; 248/327, 125, 581, 584, 585

[56] References Cited

U.S. PATENT DOCUMENTS

| | | | |
|---|---|---|---|
| 2,219,037 | 10/1940 | Street | 248/204 |
| 3,138,988 | 6/1964 | Herkt | 88/24 |
| 3,465,997 | 9/1969 | Piske | 248/350 |
| 4,030,815 | 6/1977 | Andrevski et al. | 350/255 |
| 4,183,627 | 1/1980 | Camerik | 350/252 |
| 4,442,524 | 4/1984 | Reeder et al. | 350/633 |
| 4,557,564 | 12/1985 | van Rosmalen | 350/247 |
| 4,615,585 | 10/1986 | Van Sluys et al. | 350/255 |

FOREIGN PATENT DOCUMENTS 60-20325  2/1985  Japan .................................... 350/252

Primary Examiner—Bruce Y. Arnold
Assistant Examiner—Loha Ben
Attorney, Agent, or Firm—James A. Smith

[57] ABSTRACT

A lens is mounted on a pair of parallel flexures so that it is rigidly constrained in every degree of freedom except axial movement. To achieve micro adjustments, the flexures are moved by a compound screw having two sections of different pitch to effect movement of the lens at a rate dependent on the pitch difference.

7 Claims, 2 Drawing Sheets

LENS FOCUS ADJUSTMENT MEANS

FIELD OF THE INVENTION

The present invention relates to apparatus for supporting and adjusting the focus of lenses and more specifically to such apparatus for use in highly sophisticated apparatus such as photographic printers.

DESCRIPTION OF THE PRIOR ART

Various types of apparatus have been discussed for supporting and moving lens during focusing. For example, supports positioned by lead screws and the like have been employed in photographic printers. The disadvantages of such apparatus is their mechanical complexity and the inability to make controlled micro adjustments of the type required in a sophisticated piece of equipment such as a color printer.

SUMMARY OF THE INVENTION

In accordance with a preferred embodiment of the invention, a lens is mounted on supporting means by a parallelogram linkage so that it is rigidly constrained in every degree of freedom except axial movement. To achieve micro adjustments, the linkage is moved by a compound screw having two sections of different pitch to effect movement of the lens at a rate dependent on the pitch difference.

BRIEF DESCRIPTION OF THE DRAWINGS

Other advantages of the present invention will become apparent from the following detailed description of a preferred embodiment taken in connection with the drawings, wherein.

DETAILED DESCRIPTION OF THE INVENTION

Figure 1:
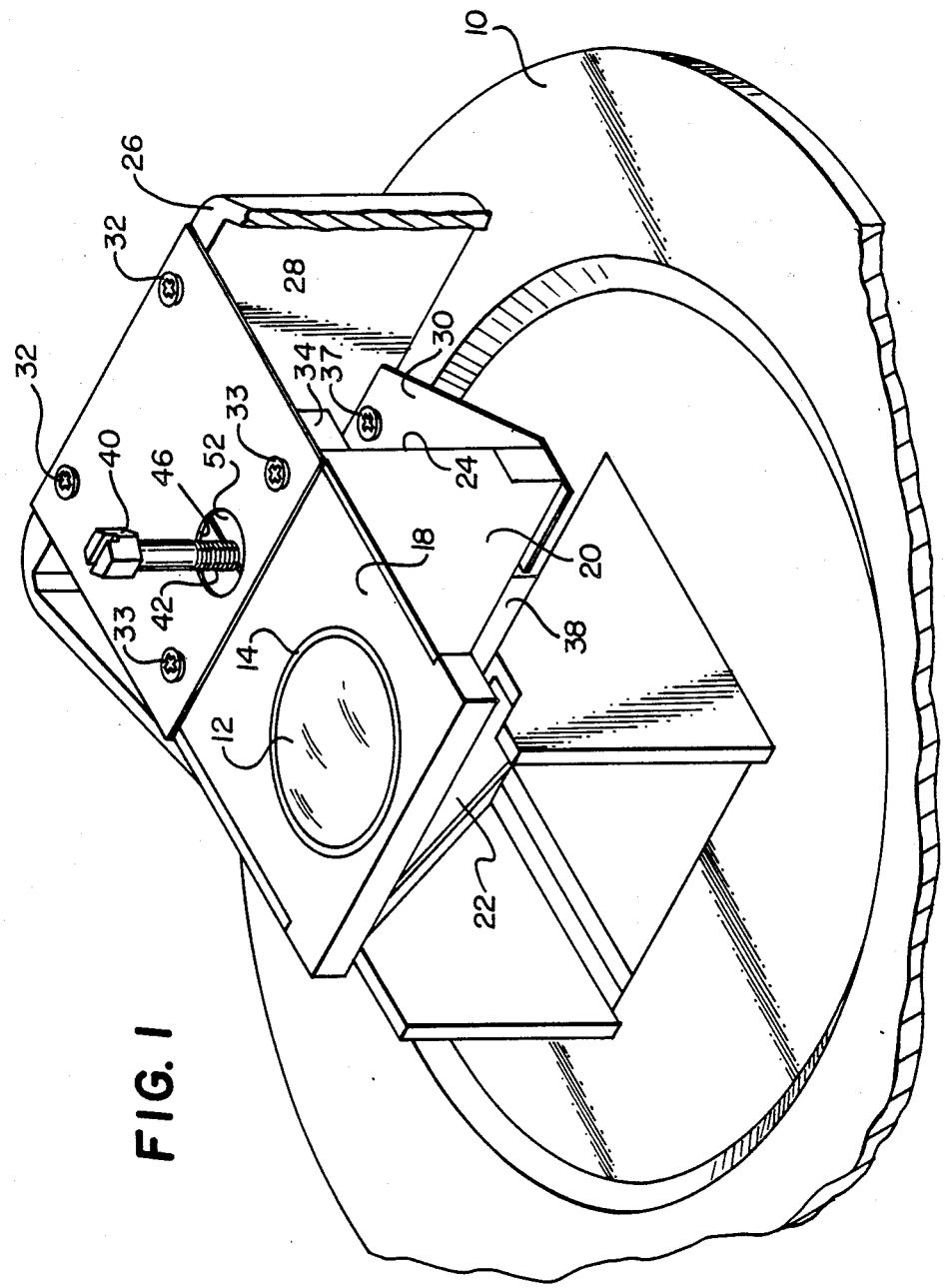
FIG. 1 is a perspective view of a lens mount incorporating a focus adjustment means in accordance with the invention.

Referring in FIG. 1, there is shown a base plate 10 adapted to be mounted on apparatus (not shown) such as a photographic printer for supporting a lens 12 in optical relationship with a negative to be printed. The lens 12 is mounted in a circular recess 14 of a lens mount comprising an upper lens supporting plate 18, triangular side plates 20, 22 and a rear plate 24, the plates being connected together by screws or welding to form a rigid structure or cast in one piece. While for simplicity the lens 12 has been shown as a single element, it will be apparent that in sophisticated apparatus, such as color printers, multi-element lens systems would be employed. The housing for such a system would be mounted in recess 14.

The lens mount is movably supported for vertical movement on a wall 26 extending upwardly from base plate 10 by a pair of parallel flexures 28 and 30. The upper flexure 28 has one end attached to the upper end wall 26 as shown by screws 32 and its other end attached by screws 33 to a ridge 34 formed on the rear plate 24. One end of the lower flexure 30 is attached to a ridge 36 formed along the lower portion of wall 26 by screw 37 and its other end attached to a ridge 38 along the bottom surface of rear plate 24 by screws (not shown).

The flexures 28 and 30 form a parallelogram mounting linkage between the wall 26 of plate 10 and the rear plate 24 of the lens mount and allow the lens mount to move only in a vertical direction without angular displacement. With this arrangement, the lens optical axis remains vertical throughout the travel of the lens adjustment.

To position the lens mount in a vertical direction, a compound screw 40 having upper and lower threaded portions 42 and 44 is received by an opening 46 in upper flexure 28 and by an opening 48 in the lower flexure. The lower threaded portion 44 is threaded in a raised surface 50 in plate 10 and the upper threaded portion 42 is threaded in a split clamp 52. The clamp 52 can be tightened by screw 54 to clamp the compound screw 40 in a desired vertical position to thereby fix the position of the lens mount.

To achieve accurate micro adjustments of the lens mount in sophisticated optical equipment, the pitch of the threaded portion 42 is preferably different than that of threaded portion 44 so that when the compound screw is rotated the lens mount will move only an amount related to the pitch difference. For example, if the upper portion 42 has a pitch of 28 threads per inch and the lower portion 44 has a pitch of 24 threads per inch, one turn of the compound screw will move the lens mount only 0.006" thus enabling micro adjustments to be achieved.

In use of the adjustment means discussed, the compound screw is initially adjusted to accurately focus the lens. The clamp screw 54 is then tightened to clamp the compound screw and lens mount securely in the focus position.

The present invention has been described in detail with particular reference to a preferred embodiment thereof, but it will be understood that variations and modifications can be effected within the spirit and scope of the invention.

I claim:

1. A lens focus adjustment means comprising:
   supporting means;
   a lens mount;
   a parallelogram linkage for connecting said lens mount to said supporting means and for constraining said lens mount to movement along a predetermined axis relative to said supporting means; and
   a compound screw positioned between said lens mount and said supporting means, said screw being rotatable to displace said lens mount along said predetermined axis.

2. A lens focus adjustment means as claimed in claim 1, wherein said linkage comprises a pair of parallel flexible plates.

3. A lens focus adjustment means comprising:
   supporting means;
   a lens mount;
   a pair of parallel flexures supporting said lens mount for movment along a predetermined axis; and
   a compound screw having a section of one pitch threaded in said lens mount and a section of a second pitch threaded in said supporting means, said screw being rotatable to displace said lens mount on said flexures a distance related to the difference in pitch of said threaded portions.

4. A lens focus adjustment means as claimed in claim 3, wherein said flexures comprise; a pair of flexible plates forming a parallelogram linkage between said lens mount and said supporting means.

5. A lens focus adjustment means as claimed in claim 4, further including means for clamping said compound screw for securing said lens mount in a desired position.

6. A lens focus djustment means comprising:
- supporting means;
- a lens mount;
- flexure means supporting said lens mount on said supporting means for movement along a predetermined axis; and
- a compound screw positioned between said lens mount and said supporting means, said screw being rotatable to displace said lens mount along said predetermined axis.

7. A lens focus adjustment means as claimed in claim 6, wherein said compound screw further includes:
- a section of one pitch threaded in said lens mount;
- a section of second pitch threaded in said supporting means; and
- said screw being rotatable to displace said lens mount on said flexure means a distance related to the difference in pitch of said threaded portions.

* * * * *

UNITED STATES PATENT AND TRADEMARK OFFICE
CERTIFICATE OF CORRECTION

PATENT NO. : 4,913,527

DATED : April 3, 1990

INVENTOR(S) : T. C. Jessop

Figure 2:
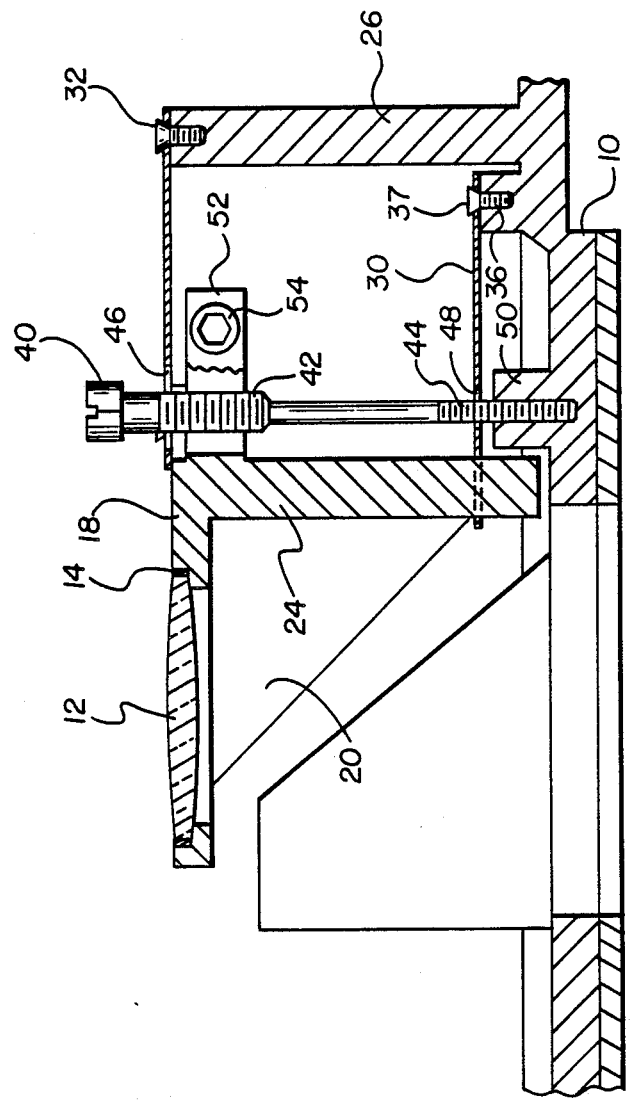
FIG. 2 is a partial section illustrating the compound screw and the flexures shown in FIG. 1.
Figure 1:
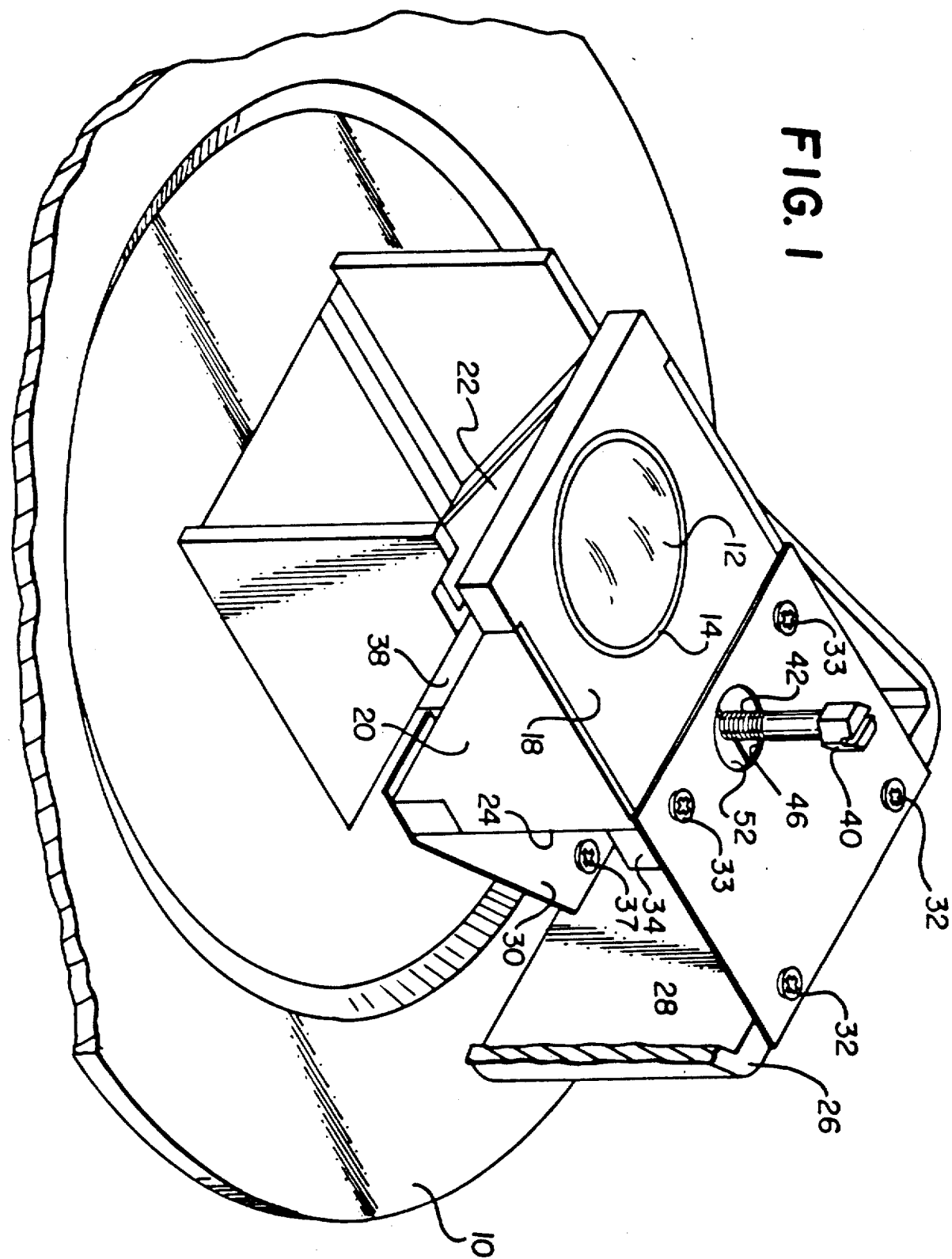
Figure 2:
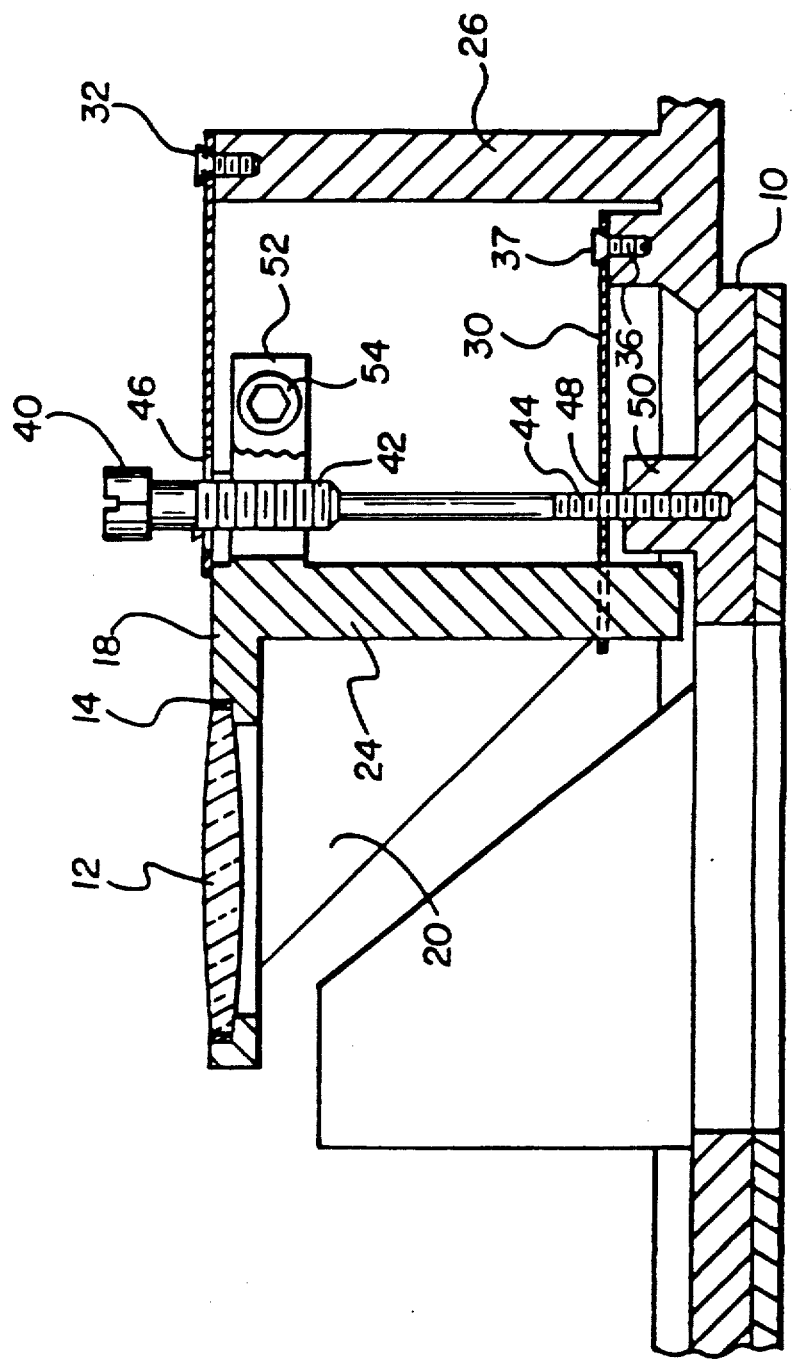

It is certified that error appears in the above-identified patent and that said Letters Patent is hereby corrected as shown below:

The sheet of Drawing consisting of Figure 1 should be deleted to appear as per attached sheets consisting of Figures 1 and 2.

Signed and Sealed this

Twenty-third Day of April, 1991

Attest:

HARRY F. MANBECK, JR.

*Attesting Officer*   *Commissioner of Patents and Trademarks*